B. P. STEDMAN.
TIRE.
APPLICATION FILED JULY 25, 1918.
1,354,520.
Patented Oct. 5, 1920.
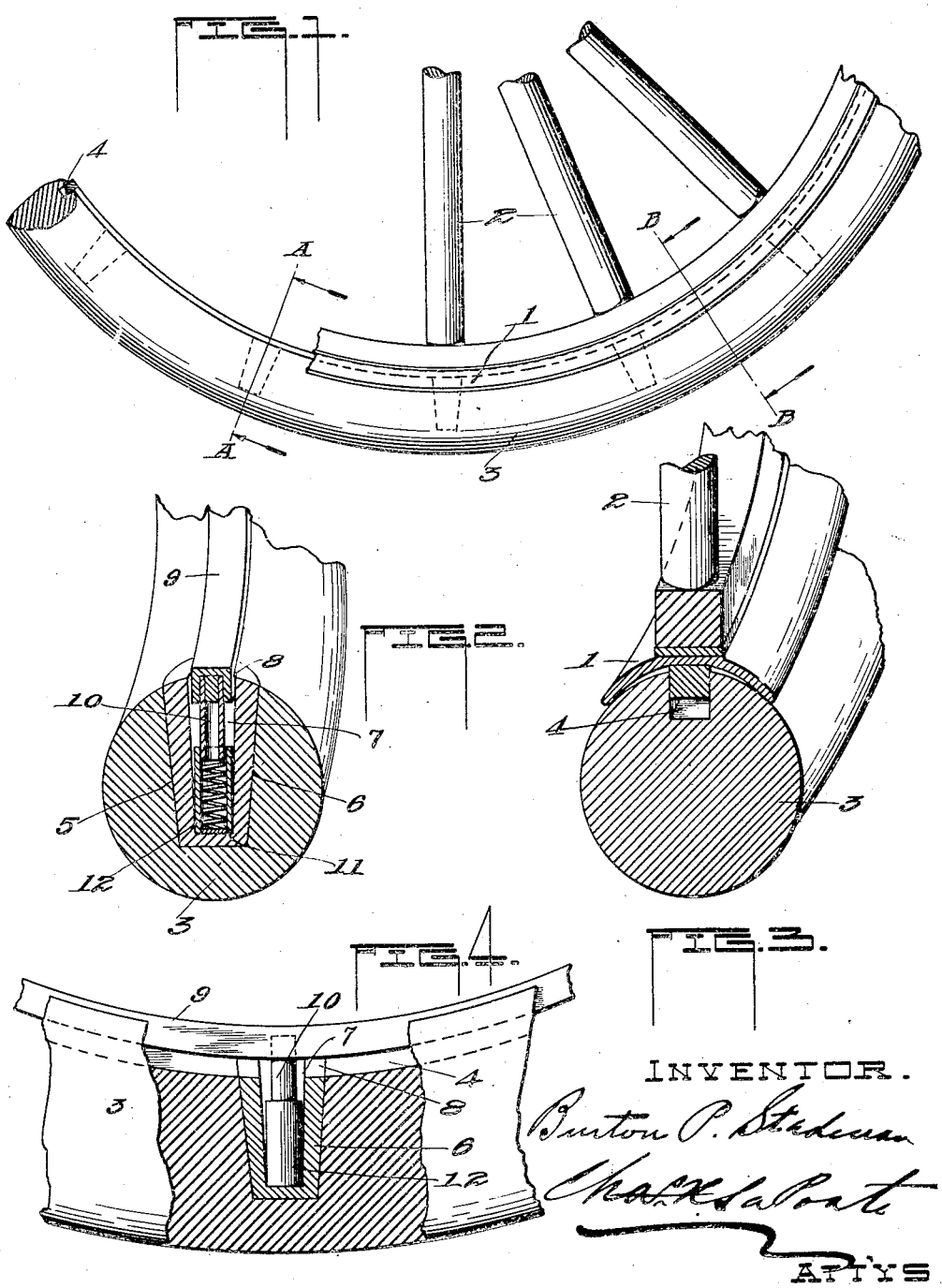
INVENTOR.
Burton P. Stedman
Charles A. Poate
ATT'YS

UNITED STATES PATENT OFFICE.

BURTON P. STEDMAN, OF PEORIA, ILLINOIS.

TIRE.

1,354,520.  Specification of Letters Patent.  Patented Oct. 5, 1920.

Application filed July 25, 1918. Serial No. 246,683.

*To all whom it may concern:*

Be it known that I, BURTON P. STEDMAN, a citizen of the United States, a resident of Peoria, in the county of Peoria and State of Illinois, have invented new and useful Improvements in Tires, of which the following is a specification.

This invention has reference to a new and useful improvement in resilient elements for solid rubber tires for automobiles, and the like.

The object of the present invention, is to provide a solid rubber tire with an inner circumferential groove intersecting a plurality of preferably tapered pockets, adapted to receive correspondingly shaped rubber plugs, provided with sockets, and adapted to contain contractible and expandible means connected with a rubber ring normally partially seated within the groove in said tire, and adapted to give to pressure to relieve the jar upon the wheel as the tire travels over irregular surfaces.

That the invention may be more fully understood, reference is had to the accompanying drawings, forming a part of the description, in which—

Figure 1 is a partial elevation of a wheel and tire, with my improvements applied thereto;

Fig. 2 is an enlarged cross-section, as the same would appear, if taken on the line A—A of Fig. 1;

Fig. 3 is an enlarged cross-section as the same would appear, if taken on the line B—B of Fig. 1, and Fig. 4 is a partial longitudinal sectional view of the tire.

Like characters of reference denote corresponding parts throughout the figures.

1 denotes the usual rim of the wheel, preferably concave, as shown, and 2 are the spokes to connect the rim and hub, not shown.

3 designates a solid tire, preferably of rubber, which may be adjusted to the rim 1 in any well known manner. This tire is formed with an inner circumferential groove 4, preferably rectangular in cross-section. This groove, when the tire is on the rim is located centrally of said rim. The tire is further provided with a plurality of preferably tapered pockets 5 which intersect the groove 4. Said pockets may be arranged to coincide with the spokes of the wheel, or in any other manner, and may be as numerous as may be desired.

For each pocket 5 there is a correspondingly shaped plug 6, preferably made of the same material as the tire 3, and when inserted in said pockets, the exposed ends of the plugs are flush with the surface of the tire. The plugs are formed with sockets 7 closed at their inner ends, which sockets may be formed by coring the plug, and said plugs are further provided with transversely arranged grooves 8 at their exposed ends which match with the groove 4 in the tire.

9 denotes a ring, also preferably of the same material as the tire 3, and when the tire is assembled on the rim 1, this ring is preferably partially seated in the groove 4 in the tire; that is, under normal conditions, and suitably connected with said ring, by vulcanizing or otherwise are a plurality of short stems 10 which enter sockets 7 in blocks 6 and preferably bear against yielding members 11, such as springs, carried within casings 12 also seated within the sockets 7 of the plugs 6.

It is obvious, that with the construction shown, there will be a yielding movement between the parts within the plugs, including the ring 9, as the tire travels over irregular surfaces, thereby relieving the wheels from constant jarring, without the danger of punctures and the usual troubles incident thereto.

When the tire is sufficiently worn, to require replacements, it is obvious that the resilient elements and associated parts, including the plugs, may be preserved and used over and over again.

What I claim is:—

1. A tire formed with an inner circumferential groove, and a plurality of pockets intersecting said groove, a ring normally partially seated in said groove, and resilient means in each pocket of the tire, said resilient means and said ring being operatively related.

2. A tire formed with an inner circumferential groove, and a plurality of pockets intersecting said groove, a plug for each pocket and having a socket, a ring normally partially seated in said groove, a resilient member in each plug, and a plurality of members connected with said ring, one at each plug, said last mentioned members being in co-acting relation with the resilient members in said plugs.

3. In combination with the rim of a wheel, of a solid rubber tire fitting said rim, said tire formed with an inner circumferential groove, and a plurality of pockets intersecting said groove, a removable plug for each pocket and having a socket, a ring fitting said groove in the tire and bearing against the wheel rim, a resilient member in each plug, and a plurality of members connected with said ring, one at each plug, said last mentioned members being in co-acting relation with the resilient members in said plugs.

In witness whereof, I have hereunto affixed my hand this 24th day of July, 1918.

BURTON P. STEDMAN.